(12) United States Patent
de Cremoux et al.

(10) Patent No.: US 7,994,762 B2
(45) Date of Patent: Aug. 9, 2011

(54) DC TO DC CONVERTER

(75) Inventors: Guillaume de Cremoux, Edinburgh (GB); Roger Peppiette, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 424 days.

(21) Appl. No.: 12/001,700

(22) Filed: Dec. 11, 2007

(65) Prior Publication Data

US 2009/0146623 A1    Jun. 11, 2009

(51) Int. Cl.
*G05F 1/59* (2006.01)
(52) U.S. Cl. ..................................................... 323/271
(58) Field of Classification Search .................. 323/222, 323/225, 259, 265, 282–285, 288, 290, 301, 323/324
See application file for complete search history.

(56) References Cited

U.S. PATENT DOCUMENTS

| | | | | |
|---|---|---|---|---|
| 4,160,276 A | * | 7/1979 | Baker | 348/625 |
| 4,326,603 A | * | 4/1982 | Darrow et al. | 184/6.1 |
| 4,807,147 A | * | 2/1989 | Halbert et al. | 702/66 |
| 5,469,095 A | * | 11/1995 | Peppiette et al. | 327/110 |
| 5,831,418 A | | 11/1998 | Kitagawa | |
| 5,907,299 A | * | 5/1999 | Green et al. | 341/143 |
| 6,037,755 A | | 3/2000 | Mao et al. | |
| 6,166,527 A | * | 12/2000 | Dwelley et al. | 323/222 |
| 6,812,676 B2 | * | 11/2004 | Tateishi | 323/225 |
| 6,984,967 B2 | | 1/2006 | Notman | |
| 7,157,888 B2 | | 1/2007 | Chen et al. | |
| 7,176,667 B2 | | 2/2007 | Chen et al. | |
| 7,256,570 B2 | * | 8/2007 | Zhou et al. | 323/224 |
| 7,265,524 B2 | * | 9/2007 | Jordan et al. | 323/225 |
| 7,298,119 B1 | * | 11/2007 | Summit et al. | 323/225 |
| 7,453,247 B2 | * | 11/2008 | de Cremoux | 323/285 |
| RE40,915 E | * | 9/2009 | Isham | 323/224 |
| 2006/0176038 A1 | | 8/2006 | Flatness et al. | |
| 2007/0115248 A1 | * | 5/2007 | Roberts et al. | 345/102 |
| 2008/0001587 A1 | | 1/2008 | Cremoux | |
| 2009/0102441 A1 | * | 4/2009 | de Cremoux et al. | 323/271 |

* cited by examiner

*Primary Examiner* — Adolf Berhane
*Assistant Examiner* — Yemane Mehari
(74) *Attorney, Agent, or Firm* — Kenyon & Kenyon LLP

(57) ABSTRACT

A DC to DC converter comprising an inductor, first and second electrically controllable switches and a controller, wherein the first electrically controllable switch is interposed between an input node and a first terminal of the inductor and the second electrically controllable switch extends between a second terminal of the inductor and a common node or a ground, and where a first rectifier extends between the common node or ground and the terminal of the inductor and a second rectifier connects the second terminal of the inductor to an output node, wherein the controller controls the operation of the first and second switches to perform voltage step down or step up, as appropriate, to achieve a desired output voltage and wherein a decision about when to switch the first electrically controlled switch is made as a first function of a voltage error between the output voltage and a target output voltage, and an estimate of the current flowing in the inductor.

13 Claims, 11 Drawing Sheets

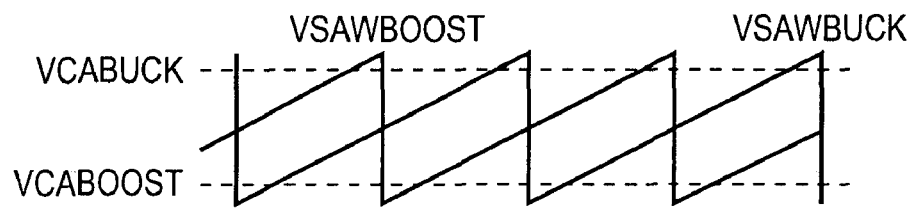
FIG. 9A
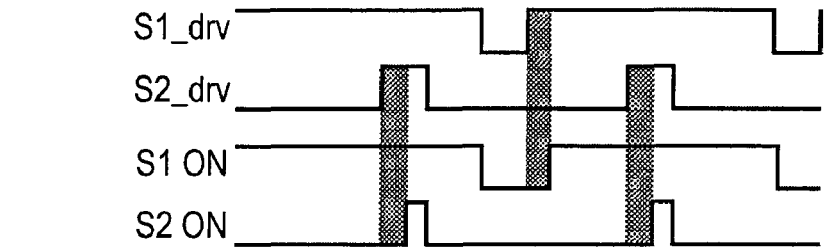
FIG. 9B
FIG. 9C

DC TO DC CONVERTER

FIELD OF THE INVENTION

The present invention relates to a DC to DC converter which can smoothly transition between operating to decrease, i.e. to BUCK, an input voltage to generate a desired output voltage to increasing an input voltage, i.e. to BOOST the input voltage, so as to generate the desired output voltage.

SUMMARY OF THE INVENTION

According to a first aspect of the present invention there is provided a DC to DC converter comprising an inductor, first and second electrically controllable switches and a controller, wherein the first electrically controllable switch is interposed between an input node and a first terminal of the inductor and the second electrically controllable switch extends between a second terminal of the inductor and a common node or a ground, and where a first rectifier extends between the common node or ground and the terminal of the inductor and a second rectifier connects the second terminal of the inductor to an output node, wherein the controller controls the operation of the first and second switches to perform voltage step down or step up, as appropriate, to achieve a desired output voltage and wherein a decision about when to switch the first electrically controlled switch is made as a first function of a voltage error between the output voltage and a target output voltage, and an estimate of the current flowing in the inductor.

It is thus possible to have a smooth transition between BUCK and BOOST modes.

The controller acts to detect when |Vout−Vin| is sufficiently small that the operation of the switches should be modified to force a current ripple to occur within the inductor. The ripple can be maintained above a minimum ripple value. Within the transition regime the sequence of operation of the switches is maintained and there is a monotonic progression in switching times as a progression is made from Vin<<Vout to Vin>>Vout and back. Thus, there are no discontinuities in operation around Vin=Vout.

Preferably the first and second rectifiers are active rectifiers implemented by third and fourth electronically controlled switches, respectively. The third electronically controlled switch can be controlled to be open when the first electronically controlled switch is closed and vice versa. Thus the control signals for the first and third switches can be complementary. The same holds true for the second and fourth electronic switches. However in a preferred embodiment precautions are taken to ensure that the first and third, or second and fourth switches are not low impedance at the same time.

The switch control signal for the first switch may then be subject to first and second offsets so as to generate first and second switch control signals that are compared with monotonically changing signals, such as saw tooth waves to individually control whether the first and second transistors are conducting or not.

Advantageously the amplitudes of the offsets are controllable by a feedback loop so as to modify the duration of signals provided to the transistors to cause them to switch into a given state.

According to a second aspect of the present invention there is provided a DC to DC converter comprising an input, an output, a first switch, a second switch, an inductor, a first rectifier, a second rectifier, a current measuring arrangement and a controller, wherein the first switch is interposed between the input and a first node, the first rectifier is connected between a common node and the first node, the inductor is connected between the first node and a second node, the second switch is connected between the second node and the common node and the second rectifier is between the second node the output and wherein the current in the coil is measured and combined with a voltage error signal, and the result thereof is averaged or low pass filtered and compared, directly or indirectly, with time varying switch control signals to control switching of the first and second switches.

According to a third aspect of the present invention there is provided a method of operating a DC to DC converter comprising an inductor, first and second electronically controllable switches and a controller, wherein the first electronically controlled switch is interposed between an input node and a first terminal of the inductor and the second electronically controllable switch extends between a second terminal of the inductor and a ground and where a first rectifier extends between the ground and the first terminal of the inductor and a second rectifier connects the second terminal of the inductor to an output node, wherein the controller is arranged to control the operation of the first and second switches to perform voltage step down or voltage step up, as appropriate, to achieve a desired output voltage; and wherein the controller is makes a decision about when to switch the first electrically controlled switch as a first function of a, voltage error between the output voltage and a target output voltage, and an estimate of the current flowing in the inductor.

BRIEF DESCRIPTION OF THE DRAWINGS

The present invention will further be described, by way of non-limiting example only, with reference to the accompanying drawings, in which:

FIG. 9 schematically illustrates how delays in operation of the switches can give rise to changes in the switch on and off times;

DESCRIPTION OF PREFERRED EMBODIMENTS OF THE INVENTION

Figure 1:
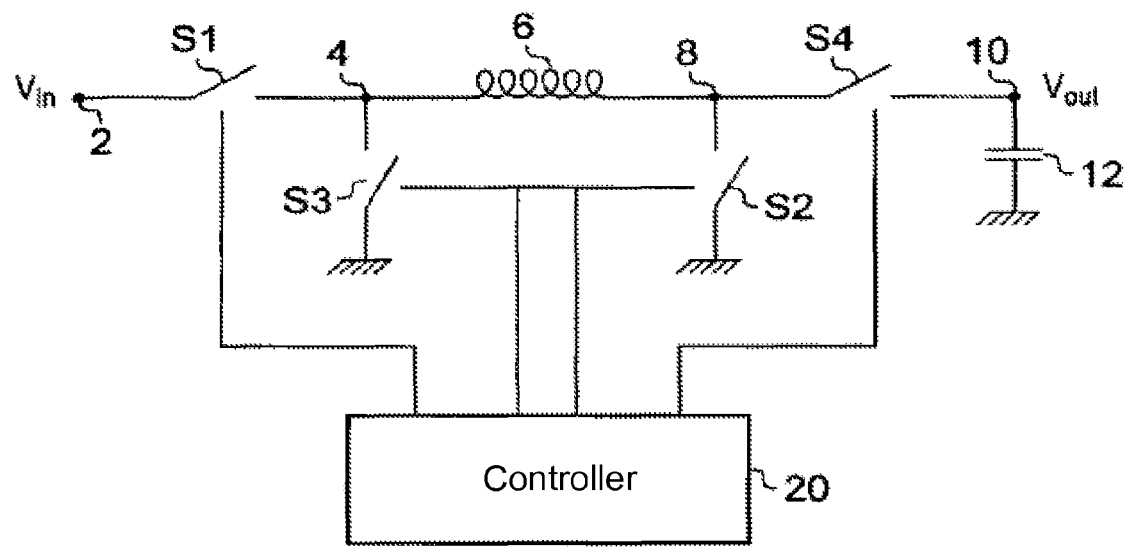
FIG. 1 schematically illustrates a configuration of a single inductor BUCKBOOST converter.

A DC to DC voltage converter operable to increase, i.e. BOOST, an input voltage Vin or to reduce, i.e. BUCK, an input voltage Vin is shown in FIG. 1.

The converter comprises an input node 2 which is connected to a first terminal 4 of an inductor 6 via a first electrically controlled switch S1. A second switch S2 extends between a second terminal 8 of the inductor 6 and ground or alternatively to a common node if the converter is "floating"—as is often the case in battery powered equipment. A third electrically controlled switch S3 extends between the first terminal 4 of the inductor 6 and ground. A fourth switch S4 extends between the second terminal 8 of the inductor 6 and an output node 10. A filtering capacitor 12 is connected between the output node 10 and ground. The switches S3 and S4 provide commutation paths and act as active rectifiers. They can be replaced by diodes if desired.

The switches are driven by a controller 20 which provides control signals to the switches.

The basic operation of the converter circuit is well known, but will be briefly described for completeness.

Buck Converter Mode

In this mode Vin is greater than Vout. The controller acts to generate a desired output voltage Vout from the input voltage Vin. This can be achieved by selectively controlling the states of switches S1 and S3. In this mode S2 is kept permanently open (high impedance) and S4 is kept closed (low impedance).

Switches S1 and S3 are driven in anti-phase. This ensures that both switches are not simultaneously conducting which would cause the input voltage Vin to short circuit to ground.

In a first phase, which can be regarded as a magnetisation phase, S1 is closed and S3 is open. Therefore the voltage across the coil, Vcoil, is $$V\text{coil} = V\text{in} - V\text{out} \qquad \text{Equation 1}$$

and the rate of change of current, and more particularly of current build up is given from $$\frac{dI}{dt} = \frac{(V\text{in} - V\text{out})}{L} \qquad \text{Equation 2}$$

Figure 2:
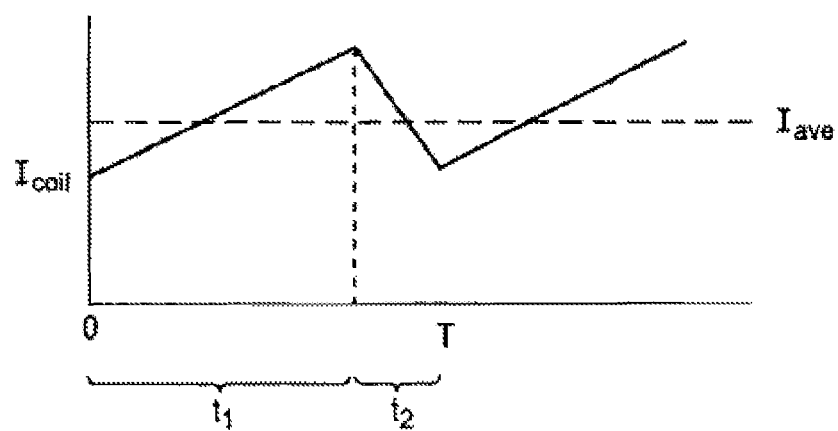
FIG. 2 schematically shows current ripple within the inductor of the circuit of FIG. 1 in BUCK mode when Vin is significantly greater than Vout.

This current flows for a first time period $t_1$ as shown in FIG. 2, towards the output node 10 where some of the current is supplied to a load and some of the current charges the capacitor 12 such that a small increase occurs in the voltage Vout across the capacitor.

The controller 20 monitors the output voltage Vout and the regulation loop causes switch S1 to open and switch S3 to close.

This causes the voltage across the inductor to become $$V\text{coil} = 0 - V\text{out} = -V\text{out}. \qquad \text{Equation 3}$$

Consequently the rate of change of current flow in the inductor 6 becomes $$\frac{dI}{dt} = \frac{-V\text{out}}{L} \qquad \text{Equation 4}$$

Thus, in a second period the current flow in the coil 6 starts to decrease, as shown in period t2. Meanwhile current is being drawn from the load so the voltage Vout may fall a little. This process, which can be regarded as a switching cycle or a control cycle, is repeated by the controller, typically at a repetition rate of 500,000 to 3,000,000 times per second. This provides very fine control of the output voltage and the voltage ripple thereon.

It can be seen in FIG. 2 that the instantaneous current varies around an average value $I_{ave}$ which represents the average current being drawn by the load—and assumed for simplicity to be constant over the two switching cycles shown in FIG. 2.

Boost Mode

When it is desired to make Vout greater than Vin, then the circuit can be operated in a BOOST mode.

In this mode switch S1 is left closed (low impedance) and S3 is left open (high impedance). Switches S2 and S4 are operated in anti-phase.

During a magnetisation phase S4 is opened and S2 is closed. Therefore the voltage across the coil is given by $$V\text{coil} = V\text{in} - 0 = V\text{in} \qquad \text{Equation 5}$$

and consequently the rate of change of current in the coil is given by $$\frac{dI}{dt} = \frac{V\text{in}}{L} \qquad \text{Equation 6}$$

so the current builds relatively rapidly. After a time period $t_3$ the controller 20 opens switch S2 and simultaneously closes switch S4.

Current from the coil now flows towards the load and into the output capacitor 12, thereby charging it, as the magnetic flux around the coil collapses.

During this phase the voltage across the coil is $$V\text{coil} = V\text{in} - V\text{out} \qquad \text{Equation 7}$$

and $$\frac{dI}{dt} = \frac{-V\text{in} + V\text{out}}{L} \qquad \text{Equation 8}$$

Figure 3:
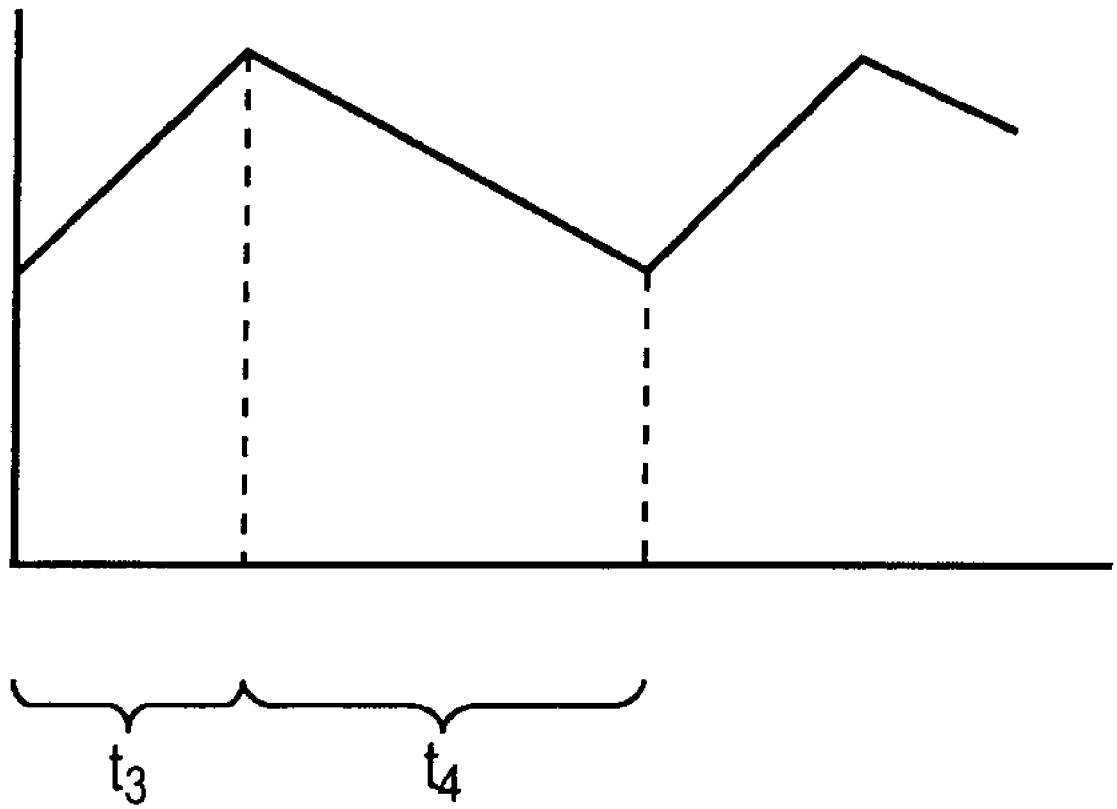
FIG. 3 schematically illustrates current ripple in the coil when the circuit is operating in BOOST mode when Vin is significantly smaller than Vout.

This can be considered as a demagnetisation phase, and is designated $t_4$ in FIG. 3.

Without going into rigorous analysis, it can be shown that if a duty cycle D represents the proportion of the time that switch S1 is conducting then, for the BUCK converter $$V\text{out} = V\text{in} \cdot D \qquad \text{Equation 9}$$

If the duty cycle represents the proportion of time that the switch S2 is conducting, then for the BOOST converter $$V\text{out} = \frac{V\text{in}}{1 - D} \qquad \text{Equation 10}$$

These BUCK and BOOST converters work very well when the difference between Vin and Vout is relatively large.

However their operation can become compromised when the difference between Vout and Vin starts to fall.

This can be seen because each converter relies on there being a change in the current flowing through the coil during the control cycle. But if Vin and Vout are nearly equal then the rate of increase of current in the magnetisation phase of the BUCK converter $$\frac{dI}{dt} = \frac{(Vin - Vout)}{L} \qquad \text{Equation 11}$$

and the rate of decrease in the demagnetisation phase of the BOOST converter $$\frac{dI}{dt} = \frac{Vout - Vin}{L} \qquad \text{Equation 12}$$

both tend to zero.

This can cause problems in maintaining a stable output voltage if the load current varies abruptly.

Users also want an output voltage to be well regulated even though the input voltage may span a range that includes Vout. Thus sometimes the BUCK converter operation may be required whereas other times a BOOST converter may be required.

Under such circumstances it is desirable to be able to transition smoothly between five ill defined operating regimes. These can be listed as 1) Vin>>Vout
2) Vin>Vout
3) Vin=Vout
4) Vin<Vout
5) Vin<<Vout In regime 1 the converter can be operated as a BUCK converter. In regime 5 the converter can be operated as a BOOST converter.

Regimes 2, 3 and 4 represent transitions between BUCK and BOOST modes of operation.

In order to avoid glitches it is desirable to make a smooth transition between regimes.

Figure 4:
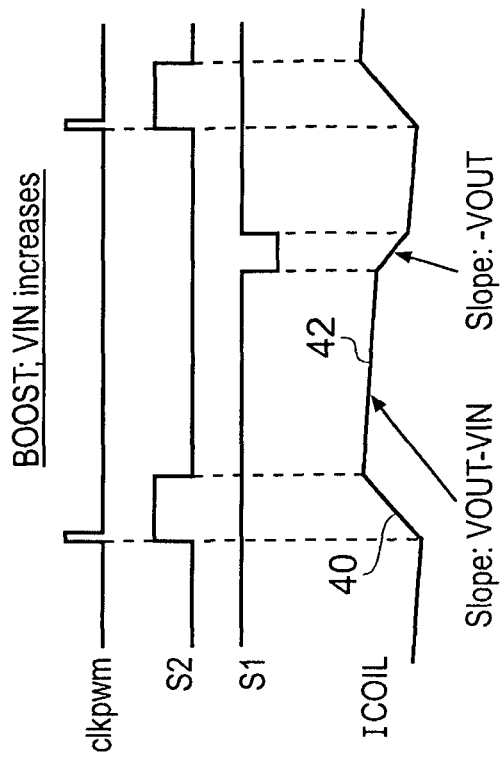
FIGS. 4a and 4b show how the coil current as a function of time is modified as the difference for Vin and Vout decreases in BUCK mode and BOOST mode respectively, together with switch sequences for prior art controllers.

As noted hereinbefore, the controller starts to become compromised when the difference between the Vout and Vin starts to fall. This is because the variation of the current $$\frac{dI}{dt}$$

tends to zero as the difference between Vin and Vout tends to zero. This loss of ripple current through the inductor degrades the transient load regulation capability of the DC to DC converter. Prior art systems are attempted to overcome this by modifying the converter such that once the duty cycle crosses a threshold, for example exceeds 85% in the case of a buck mode of operation or is lower than 15% in a boost mode of operation then the slow charge during buck mode or slow discharge during boost mode of the coil is accelerated by modifying the control of the switches such that both switches S1 and S2 are conducting at the same time. Such an arrangement is shown in FIGS. 4a and 4b. Specifically, in FIG. 4a the converter is operating in buck mode, with Vin being just slightly greater than Vout. It can be seen that once the switch S1 is closed then the coil current, Icoil, rises only slowly. In order to increase the rate of build up of current in the coil the switch S2 is only temporarily closed during a period 30 such that the current in the coil rises far more quickly. Switch S2 is then opened again prior to initiating the current discharge during a discharge period generally designated 34. FIG. 4b shows a similar situation where the converter is operating in boost mode but Vout is only slightly greater than Vin. The coil is energised by closing switches S1 and S2 simultaneously during a period generally designated 40. Then switch S2 is opened and the reverse polarity across the coil causes the current flowing therein to decrease slowly during a discharge period generally designated 42. However, in order to maintain the current ripple a fast discharge period is then included by opening switch S1, and closing S3 (or relying on the parasitic diode inherently associated with switch S3 to conduct) such that the node 4 is held close to ground and hence fast discharge occurs.

The prior art approach described in FIG. 4a and 4b is implemented with control circuits such as the LTC3780 available from Linear Technology. However the approach described above can have some problems when the input voltage crosses the output voltage, for example because the input voltage is falling as a battery discharges. Firstly a discontinuity appears in the transfer function of the device which can cause regulation cycle, as defined as a period delimited by successive clock pulses of "clkpwm" in FIGS. 4a and 4b, the sequence of switches S1 and S2 can swap over between successive cycles when the voltage transition of Vin with respect to Vout occurs. This swap and loss of regulation is manifested as a glitch at the output of the LTC3780 which can cause the unwanted introduction of noise into circuits receiving power from the DC to DC converter.

It is desirable to avoid the switching sequence changing at the voltage transition so as to reduce noise.

The build-up of current within the inductor, which may also be referred to as a coil, depends in part on the voltage difference between Vin and Vout of the DC to DC converter. However it is also desirable to monitor and control the peak current flowing in the coil since the coil is a real component and hence the conductor that it is fabricated from will experience Ohmic losses. These losses increase with the square of the current and hence excess current adversely effects the efficiency of the DC to DC converter.

Figure 5:
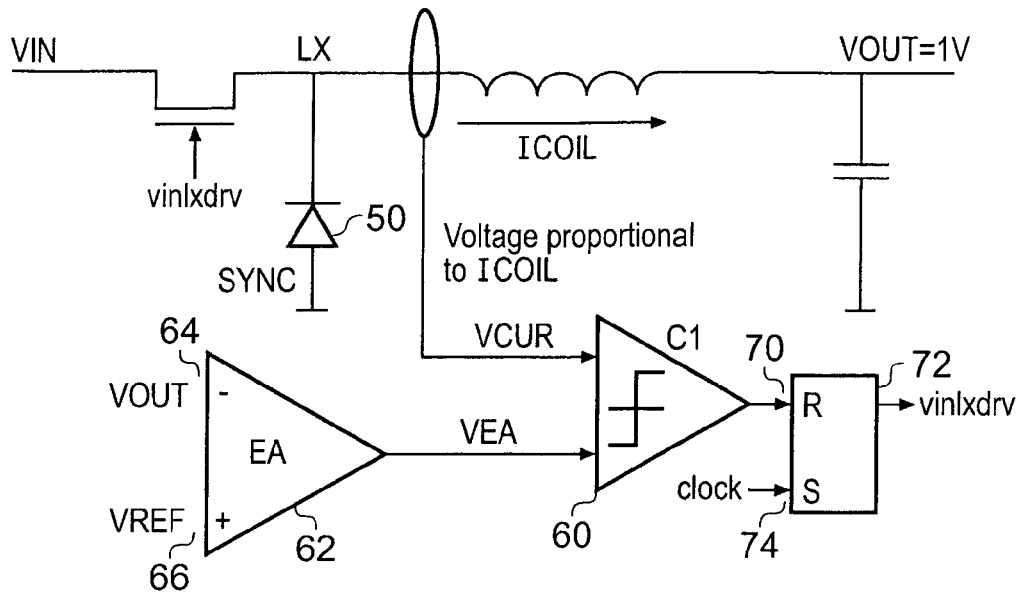
FIG. 5 illustrates a controller using peak current control.

FIG. 5 schematically illustrates a current sensing DC to DC converter in simplified form. We may assume, for simplicity, that the DC to DC converter is operating as a buck converter and hence, when compared with FIG. 1, switch S4 is always closed and switch S2 is always open. Therefore only switch one is actively driven, and switch 3 is either driven in antiphase with switch S1 or can be replaced by a fly-back diode 50 as shown here. The current flowing through the coil 6 is measured by a suitable current sensing arrangement. In practical terms, the current flowing into the coil can be estimated by measuring the voltage drop occurring across switch S1 whilst it is closed. This is sufficient even though it gives no indication of the discharge current of the coil. An estimate of the current flowing in the coil during charging is converted, in this example, to a voltage signal VCUR and provided to the inverting input of a comparator 60. A non-inverting input of the comparator 60 is supplied with a voltage error signal which is provided by error amplifier 62 which forms the difference between the output voltage Vout, and a desired output voltage or target output voltage, Vref An output of a comparator 60 is provided to the reset input 70 of a set reset latch 72 which has its set input 74 connected to receive a periodic clock signal.

Figure 6:
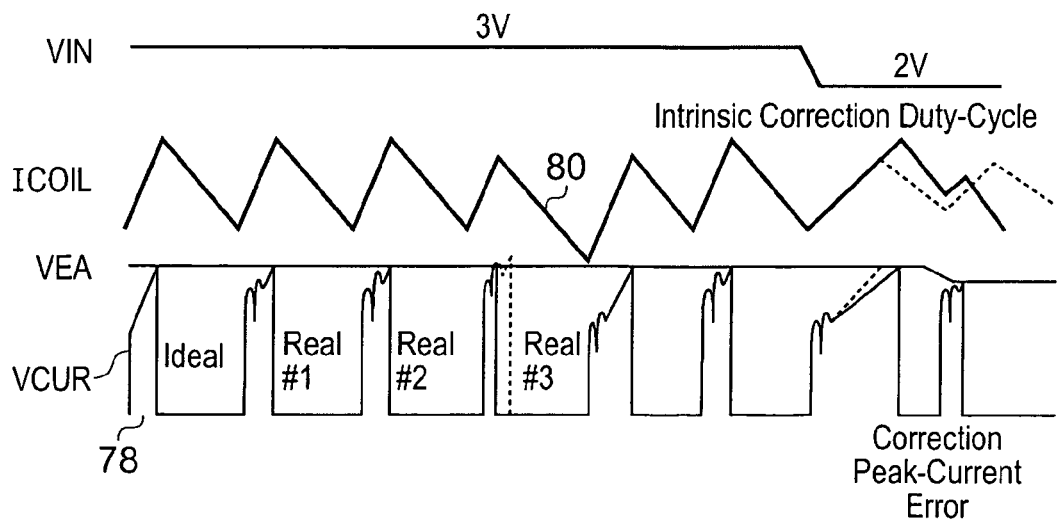
FIG. 6 shows examples of some current waveforms within the circuit of FIG. 5, and the consequence of noise in the measuring circuit.

FIG. 6 compares four signals, namely the input voltage Vin, the current in the coil, Icoil, the voltage error voltage, Va, and the estimate of the coil current in the voltage domain, VCUR. Suppose that Vin remains constant at, 3 volts and the output voltage is, say, 2.5 volts. The coil current, Icoil, increases and decreases cyclically in accordance with the normal operation that will be expected of a buck converter. In operation, each clock pulse sets the latch 72 so as to place the switch S1 in a conducting state. The coil current starts to build, and the estimate of the coil current during this charging phase is represented by voltage VCUR. The coil current is allowed to increase until such time as VCUR exceeds the value VEA thereby causing the comparator 60 to assert a signal at the reset input 70 of the latch 72 thereby placing switch S1 in a non-conducting state. The first signal portion, designated 78 of VCUR represents the ideal signal. However in reality noise in the measuring circuit means that the VCUR waveform significantly deviates from the idealised form, as represented by waveforms Real#1, Real#2 and Real#3. Both Real#1 and Real#2 are noisy, but their peak value does not occur until roughly at the expected position. However the signal Real#3 is particularly noisy and a spike occurs in it which causes it to exceed the threshold value VEA far too early. This causes the comparator to assert a signal which in turn causes the latch 74 to remove the drive signal from switch S1 far too early. This causes the charging phase of the coil to be prematurely terminated and the coil current ICOIL drops to an undesirably low value, as designated by the region 80 in FIG. 6. The presence of parasitic components such as parasitic capacitors and inductors, and cross talk between signals also gives rise to interference. These variations in the value of ICOIL gives rise to timing jitters for the switch signal, and thus the control signal associated with time period Real#3 is shorter than it should be, whereas the succeeding time period is longer. By way of an example, suppose that the voltage VCUR is given by the function VCUR=0.25×Icoil, and that the nominal coil ripple is 200 mA peak to peak. This gives rise to a change in VCUR of 50 mV peak to peak during energisation of the coil, and thus a 10 mV perturbation on VCUR or VEA can truncate the charging period by 20%.

A further problem of peak current regulation is that when Vin changes, the ripple on the coil current also changes. Then VEA must be modified to match this new ripple even if there is no change in the average coil current. This introduces a perturbation on the output voltage and the coil current.

Figure 7:
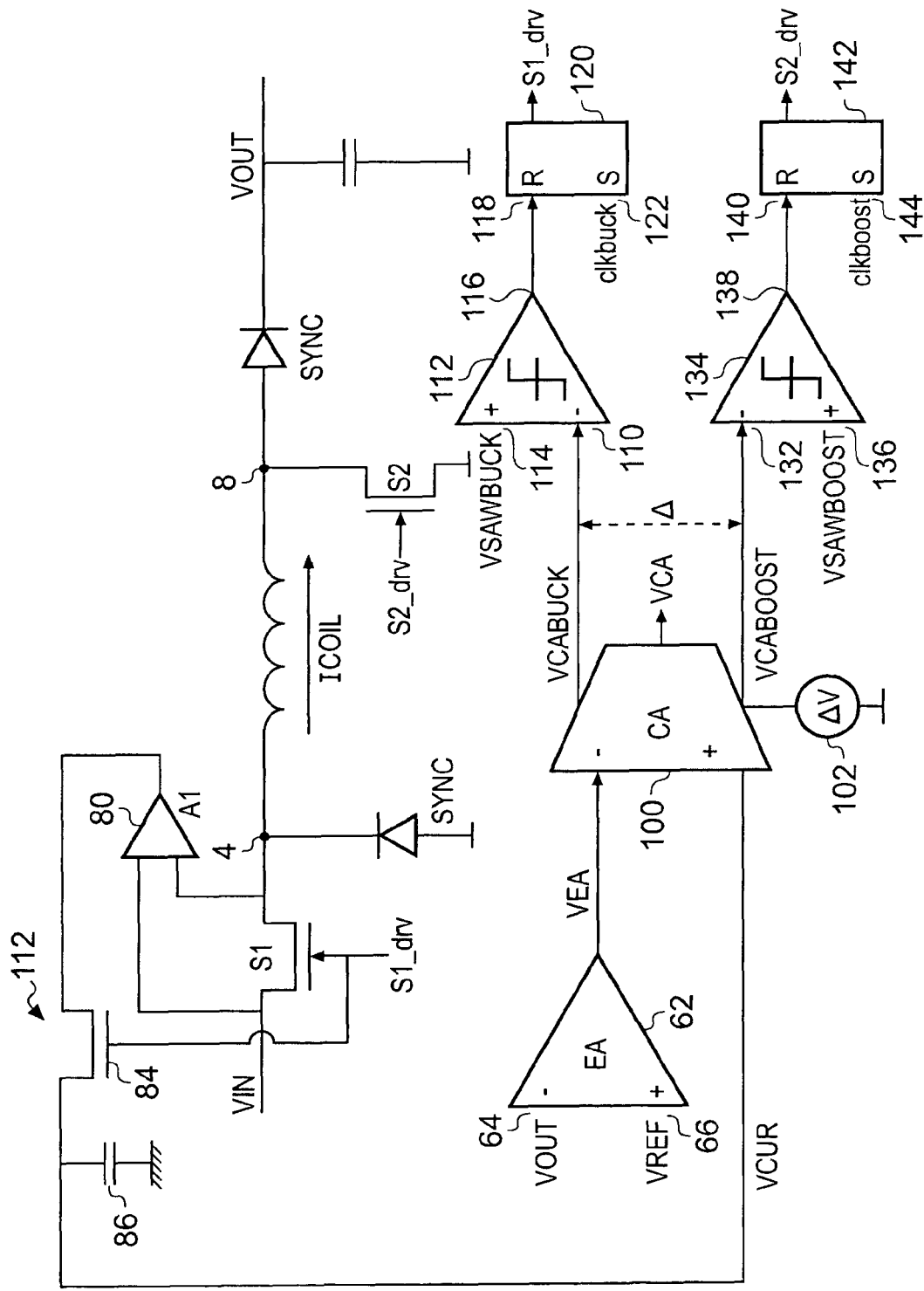
FIG. 7 shows an example of a circuit which represents an improvement over that shown in FIG. 5.

FIG. 7 schematically illustrates a DC to DC converter constituting an embodiment of the present invention and operable in BUCK and BOOST modes. This again has the basic architecture of an inductor in association with the first to fourth switches S1 to S4 as described in FIG. 1. Furthermore a current measuring arrangement is provided to measure the current in the coil. As before, the measurement of the coil current need only be performed during the charging period when the switch S1 is conducting, and hence the voltage drop occurring across switch S1 when it is conducting can be used to estimate the coil charge current. The voltage drop across the switch can be provided to an amplifier 80 who's gain $A_1$ is selected to provide a suitable transfer function to provide a scaled estimate of current to the amplifier 100. The output of the amplifier is preferably provided to a sample and hold circuit 82 which can comprise a transistor 84 driven in phase with S1 and a storage capacitor 86 to hold the voltage output by the amplifier 80. Alternatively, a scaled transistor may be provided and the voltage drop across the transistor may be controlled to match the voltage drop across S1 by a feedback loop. The current flowing in the scaled transistor can then flow through a resistor such that a reliable current to voltage conversion is performed. Using the voltage drop across the switch S1 has the advantage of not introducing any further resistance into the circuit deliberately for the purposes of measuring the coil current. As before, the coil current is converted into a voltage, but now is provided to the inverting input of an amplifier 100. An error amplifier 62 receives measurements of Vout and Vref at its inverting and non-inverting inputs, 64 and 66, respectively and generates a voltage error signal which is provided to the non-inverting input of the amplifier 100. The amplifier 100 is configured to be slow in its response, for example by forming it with a low pass filter response characteristic as set by a feedback loop, such that it responds to a moving average value of the coil current rather than the instantaneous value. The amplifier 100 forms a value VCA based on the difference between VEA and VCUR. The amplifier 100 also has further input responsive to a voltage generator 102 which generates a voltage ΔV which is used to force a voltage difference between first and second outputs of the amplifier, labelled VCABUCK and VCABOOST such that the difference between these voltages corresponds to ΔV with $$VCABUCK = VCA + \frac{\Delta V}{2} \text{ and } VCABOOST = VCA - \frac{\Delta V}{2}$$

where
VCA=(VEA−VCUR)×$A_0$ where $A_0$ represents the gain of the amplifier, subject to the amplifier further including a low pass transfer function.

The signal VCABUCK is provided to an inverting input 110 of a comparator 112. the non-inverting input 114 of the comparator 112 is connected to receive a first control signal, VSAWBUCK which although cyclic varies monotonically in a first time portion. Conveniently, though not necessarily, the first control signal is a saw tooth waveform. An output 116 of the comparator 112 is connected to a reset input 118 of a set reset latch 120. A set input 122 of the latch 120 is driven with a first clock signal, clkbuck. An output of the latch is a drive signal S1_drv which is provided to a gate of a field effect transistor acting as the first switch, S1.

Similarly the VCA BOOST output is connected to the inverting input 132 of a comparator 134 whose non-inverting input 136 receives a periodic signal which has a monotonically varying portion which conveniently is saw tooth waveform VSAWBOOST. An output 138 of the comparator 134 is connected to a reset input 140 of a set reset latch 142 whose set input 144 receives a further clock signal, clkboost, which is phase shifted with respect to the clkbuck clock signal. An output of the set reset latch provides a drive signal S2_drv which is provided to a gate of a transistor acting as a second switch, S2.

In use, when VEA differs from the average value of VCUR, then the output VCA of the amplifier is slowly increased or decreased. The advantage of this relatively slowly changing signal is that any short-term perturbations due to parasitic signals or noise on VCUR is not tracked because the amplifier 100 acts as a low pass filter. As noted before, the voltage VEA is actually converted into two output voltages, VCABUCK and VCABOOST centred around VCA. If the voltage VEA is larger than VCUR, then both VCABUCK and VCABOOST increase simultaneously, and the voltage difference ΔV between them remains constant, unless the voltage generator is operated to vary the voltage difference ΔV. The values of VCABUCK and VCABOOST are compared with VSAWBUCK and VSAWBOOST, respectively, in order to control the switching of the transistors S1 and S2.

Figure 8:
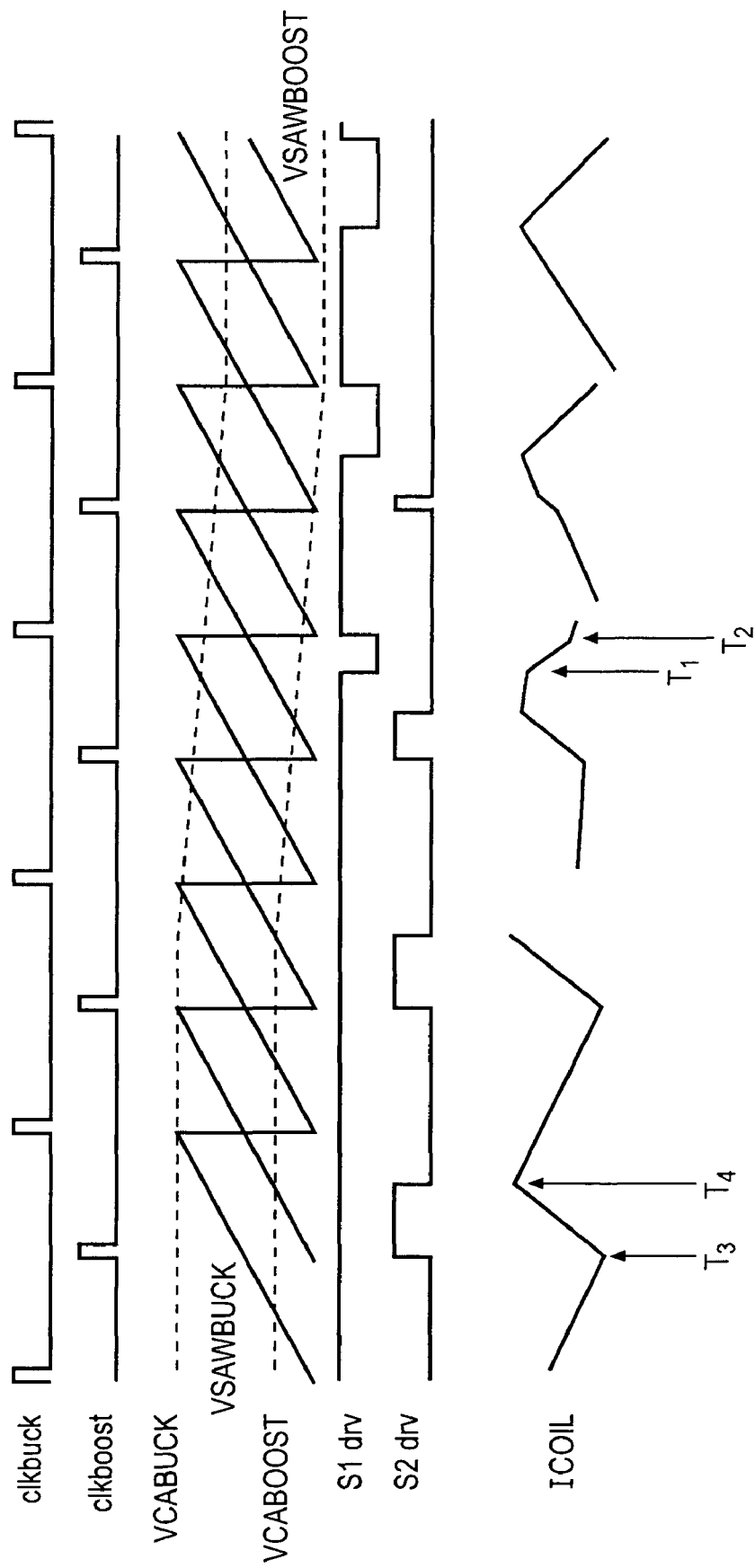
FIG. 8 shows waveforms for driving the switches S1 and S2 in greater detail.

Each occurrence of the clock, clkbuck, or the occurrence of a specific clock edge, such as the rising edge provided to the set reset latch 120 attempts to switch transistor S1 on. However if the reset pin is active, then this takes precedence and the latch remains in the reset state. However, if we assume that the value of VCABUCK is greater than the instantaneous value of VSAWBUCK, at the time of the clock pulse then the transistor is switched on and it remains on until such time as the value of VSAWBUCK exceeds the value VCABUCK. This need not happen and hence the transistor may remain switched on for a number of cycles, as illustrated in FIG. 8 where for the first two clock cycles S1_drv remains "high" so the transistor is conducting during this period. However as shown in that Figure, there comes a time, T1, where the value of VSAWBUCK exceeds VCABUCK, because VCABUCK has decreased over time, and this causes the transistor S1 to be switched off until the next occurrence of the clock pulse clkbuck at T2. Similarly the signal VCABOOST is compared with VSAWBOOST. The drive to transistor S2 is switched on at each occurrence of the clock signal clkboost, for example at T3, unless the reset of the latch 142 is active. The transistor S2 remains conducting until such time as VSAWBOOST exceeds the value of VCABOOST when it is switched off, as shown at T4. It can be seen in FIG. 8 that it is possible for the value VCABOOST to always be less than the value of VSAWBOOST such that transistor S2 is not switched on during any given clock cycle.

The result of these actions is that, if Vout is too high then the error amplifier 62 decreases the output voltage VEA. As a result the amplifier 100 slowly increases the value of VCABUCK and VCABOOST.

At the beginning of the sequence shown in FIG. 8 transistor S1 was always on whereas transistor S2 was driven in a pulsed manner. As a result the current in the coil was increasing by a value $$\frac{dI}{dt} = +\frac{Vin}{L},$$

and decreasing with a value of $$\frac{dI}{dt} = \frac{(Vin - Vout)}{L}.$$

However the reduction of the value VCA, and hence VCABUCK and VCABOOST causes a decrease in the time for which switch S2 is conducting, and ultimately can it permanently non-conducting. Similarly, switch S1 becomes occasionally deactivated. As a consequence, we move to a regime where the coil current is increased at a rate given by $$\frac{dI}{dt} = \frac{(Vin - Vout)}{L}$$

and the coil current is decreased by $$\frac{dI}{dt} = \frac{-Vout}{L}.$$

It can therefore be seen that as VCA decreased, the average coil current is decreased in a monotonic way until such time as VCUR (which is a function of the average coil current) reaches VEA. At this point VCA has reached its steady state point. In fact, as shown in FIG. 8, the circuit can make a continuous and smooth transfer from PURE BOOST, to BUCK-BOOST, to PURE BUCK operation depending on the current level set by VEA. There are no perturbations in the switching sequence in the transition between PURE BOOST and PURE BUCK via the intermediate operating regime.

The low pass filter action acts to reduce the susceptibility of the converter to perturbation by noise or signal fluctuations resulting from parasitic components. Thus the magnitude of perturbations can be effectively decreased by several times due to the filter action. Furthermore, the use of the saw tooth signals and control signals further gives immunity to perturbation by noise. Thus, if the saw tooth signals have a amplitude 1 volt peak to peak, then the original 10 mV of perturbation discussed hereinbefore, when filtered, is, say, reduced by a factor of 2 to 5 mV, only results in a jitter or timing error of 0.5% compared to the 20% discussed in respect of the circuit shown in FIG. 5.

As discussed before, there is a range of converter operation in which all the switches are operative in any given control cycle such that it operates in a BUCK-BOOST mode so as to deliberately increase the magnitude of the current ripple in the inductor. The range of input voltage over which this mode occurs should be carefully controlled as too large a BUCK-BOOST range results in reduced efficiency, but too small a BUCKBOOST range results in poor response to transient changes in the load. The range can be controlled by controlling the magnitude of the saw tooth waveforms, or the value of ΔV. However, when operating at fast switching rates, for example several MHz, then other factors need to be considered as well.

Suppose we consider the situation shown in FIGS. 9a to 9c. For simplicity, in FIG. 9a the saw tooth waveforms VSAWBOOST and VSAWBUCK have the same magnitude and are offset from each other by 180° in phase. This is particularly easy to do as the generation of the VSAWBOOST and clkboost can be initiated at one edge of a master clock signal and the VSAWBUCK and clkbuck signals can be initiated a the other edge of the master clock signal where the master clock has a 50% duty cycle—which can be reliably achieved by dividing a faster clock by two. Furthermore the values VCABUCK and VCABOOST are symmetrically disposed about the average value of the saw tooth waveforms. This should result in symmetry of the driving signals of S1 and S2, as shown in FIG. 9b where the time for which S1 is off is identical to the time for which S2 is on. However in reality these switched durations of the field effect transistors forming the switches are different because, for example, switch S1 will be formed from a P type FET whereas switch S2 is formed an N type FET. Furthermore timing delays may be deliberately inserted by the designer in order to avoid pairs of switches, such as switches S1 and S3, or switches S2 and S4 being conducting at the same time. These switch activation and deactivation times to switch the switches on and off can vary with process, temperature, and even with the values of Vin and Vout therefore even in this ideal scenario on which the time for which switch S1 is off corresponds to the time for which S2 is on, in practise this will not be achieved and hence the current flow in the coil will deviate from the idealised form.

The inventor has realised that it is advantageous for a further control strategy to be implemented during the BUCK-BOOST mode of operation so as to compensate for switch transition errors. This becomes especially important when the clock frequency is particularly high, for example several MHz, where the timing errors required to switch on or switch off a FET can now become a significant portion of the cycle time for the BUCKBOOST converter, whereas these errors are insignificant when the converter is only running at several hundred kHz.

Figure 10:
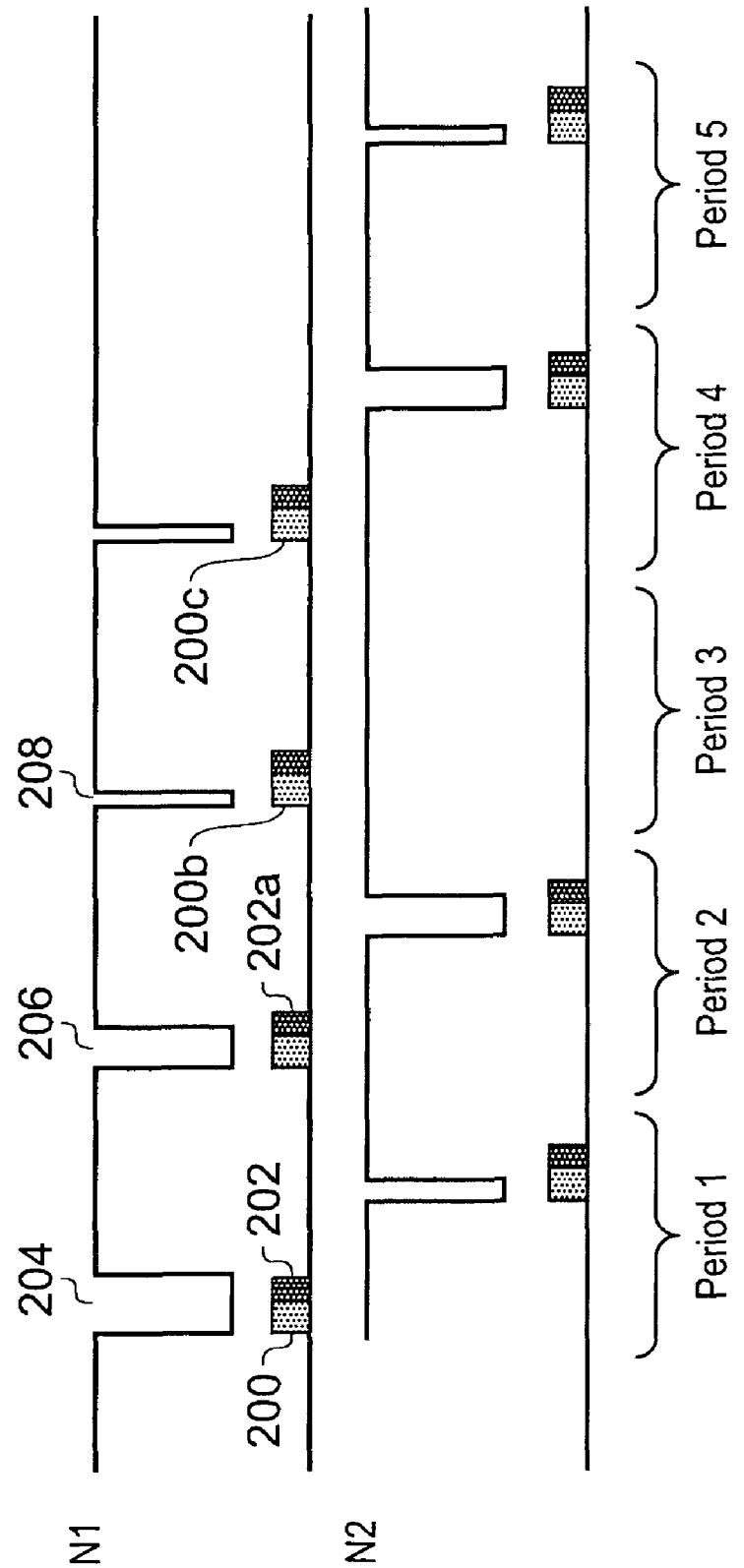
FIG. 10 shows how the duration for which switch S1 is off and switch S2 is on can be compared to target durations to control operation during a BUCK-BOOST mode.

In order to compensate for the delays that can occur between asserting a control signal for a transistor to switch on or off, and the transistor actually switching on or off, then it is necessary to measure the times for which the transistors are actually conducting. This can be achieved simply by measuring the voltage at the node 4, so as to determine whether S1 is conducting, or at the node 8 so as to determine whether S2 is conducting. If S1 is not conducting then the voltage at node 4 is either zero volts, when S3 is an active rectifier or 0.7 volts when a fly-back diode is used. Similarly the voltage at node 8 either zero volts when S2 is conducting or Vout when it is not. Therefore the times for which the transistors are conducting and not conducting can be easily determined. FIG. 10 shows a determination of the measured times for which the transistors S1 and S2 are in conducting, and non-conducting states respectively. We are generally interested in when switch S1 goes non-conducting, which is determined by the voltage at node 4 going low, and also the time for which S2 is conducting, which is shown by a voltage at node 8 going low. Therefore, with FIG. 10, the interesting periods are those for which the voltages at which the first node N1 (designated 4 in FIG. 1) and the second node N2 (designated 8 in FIG. 1) go low. The times for which the voltages should be low are known to the controller, and the time is for which the voltages actually go low can be compared to transition windows. The transition window is made up of two parts, which in FIG. 10 are designated by two distinct shadings. The first part 200 of a transition window indicates a time mask which measures whether the duration for which the corresponding switch is on or off is too short. The second time mask 202 marks the time range in which a switching transition is expected to occur. To put this in context, consider the first pulse 204 at node N1 which corresponds to transistor S1 switching off. The first mask time 200 is initiated at the time the switching signal is sent to the transistor S1. It then times out the first period 200 and a check is made to see whether the transistor S1 has switched during that period. In this instance it has not. The period 202 is then commenced which indicates a period in which the transistor switching is expected. At the end of that period if a switching has not occurred then it is known that the pulse exceeds its desired duration. Steps can then be made to change the duration of the pulse. Suppose that, because the pulse 204 is too long, a change is made such that the pulse 206 is shortened. Here we can see that the transition to switch the transistor S1 back on occurs during the normal time window 202a associated with a second pulse. However with a third pulse a transition occurs during the "too short" window 200b associated with the third pulse, and indeed the fourth pulse also switches within a "too short" window 200c associated with the fourth pulse. Based on these measurements the pulse width can be varied. Similar measurements are taken for the pulses at the second node N2, so during the first period the first pulse at N2 is too short whereas for the second period it is the correct length, for the third period it is missing altogether, for the fourth period it is the correct length and for the fifth period it is too short. The controller could seek to vary the individual pulse durations, although adequate control can be achieved by using a relatively simple control strategy in which:

i) For each one of the time periods, the durations of the pulses are measured.
ii) If both the pulses are too short (which includes one or other of them not existing at all) then the duration of the pulses are increased.
iii) If both pulses exist, but one of them exceeds the desired duration, then the duration of the pulses are decreased.

For all other conditions, such as both pulses the correct size, one pulse the correct size and the other too short or one pulse greater than the correct size and the other missing, then no alteration to the pulse lengths are made.

The pulse lengths can be varied by changing the value of ΔV generated by the voltage generator 102 shown in FIG. 7.

If we compare the control strategy with FIG. 10, we can see that during period 1 the off pulse at N1 exceeds the timing mask and is too long. We can deduce that we are in BUCK mode and do not need any BUCK-BOOST operation. The on pulse for switch S2 is needed. Hence the controller acts to decrease the BUCK-BOOST window of operation, and in practice a counter is counted up and the value of ΔV is increased by an increment.

In period 2 both pulses are present, but are neither too short nor too long and hence the value of Δ is maintained as the BUCK-BOOST window is operating as expected. In period 3 the pulse for switch S1 is too short and there is no pulse on switch S2. Consequently the BUCK-BOOST window is too small and needs to be corrected by reducing the value ΔV. In period 4 the pulse on switch S2 is within range whereas the switch on pulse S1 is short. Under these circumstances there is no change to the value ΔV.

By applying to this algorithm the value of ΔV is regularly adjusted to maintain optimal switching timings.

Figure 11:
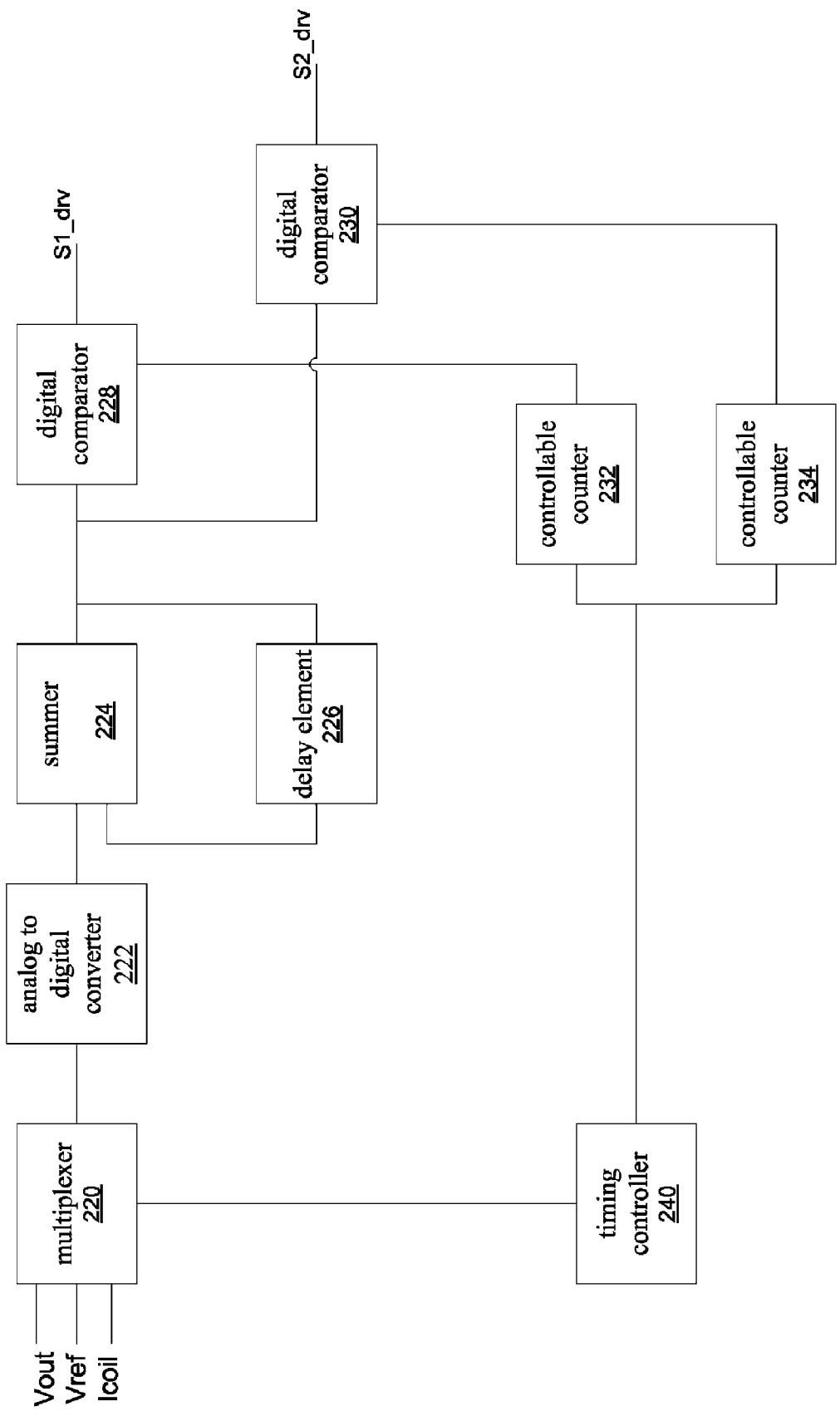
FIG. 11 shows a block diagram of a digital controller for a DC to DC converter constituting an embodiment of the invention.

The invention has, hitherto, been described in terms of analog components. It will however be apparent that the whole system could equally be implemented within the digital domain. FIG. 11 schematically shows a digital control system which is analogous to and takes the place of the error amplifier 62, the amplifier 100, the comparators 114 and 134 and the set reset latches 120 and 142 of FIG. 7. A multiplexer 220 receives the signals Vout, Vref and ICOIL and provides them to an analog to digital converter 222 such that the signals are sequentially converted into the digital domain. The output from the converter 222 is provided to a summer 224 which forms a weighted sum of the signals, and herein this optionally includes a subtraction element such that the sum Vref−Vout−ICOIL is formed at the output of the summer 224. The output of the summer is provided to a delay element 226 whose output is also scaled and supplied to the input of the summer 224 such that a infinite impulse response filter is formed giving rise to a low pass filter function. The output of the summer is further provided to digital comparators 228 and 230. The comparators receive signals from controllable counters 232 and 234. Each counter can count up in the digital domain from an individual start value for the duration which corresponds to the inter-clock period shown in FIG. 8. Given that the counters can start counting at different times and at different individual values, it can be seen that the voltage difference ΔV which was introduced in FIG. 7 can be caused to occur in the counter values by starting them at different start points. Alternatively each counter can count the same number sequence and the ΔV can be formed at the summer 224. The comparators 228 and 230 can also implement the logic of the reset set latches so that they output the signals S1_drv and S2_drv, respectively. The multiplexer 220 and the counters 232 and 234 can be responsive to a timing controller 240 which can also be responsive to measurements of the duration of the switch on and off times of the transistors to implement the algorithm which has just been described hereinbefore with respect to FIG. 10. The timing controller 240 can vary the starting values of the counts of the individual times 232 and 234 to control the switch duration, as varying the starting values is also equivalent to varying the voltage ΔV shown in FIG. 7.

Figure 12:
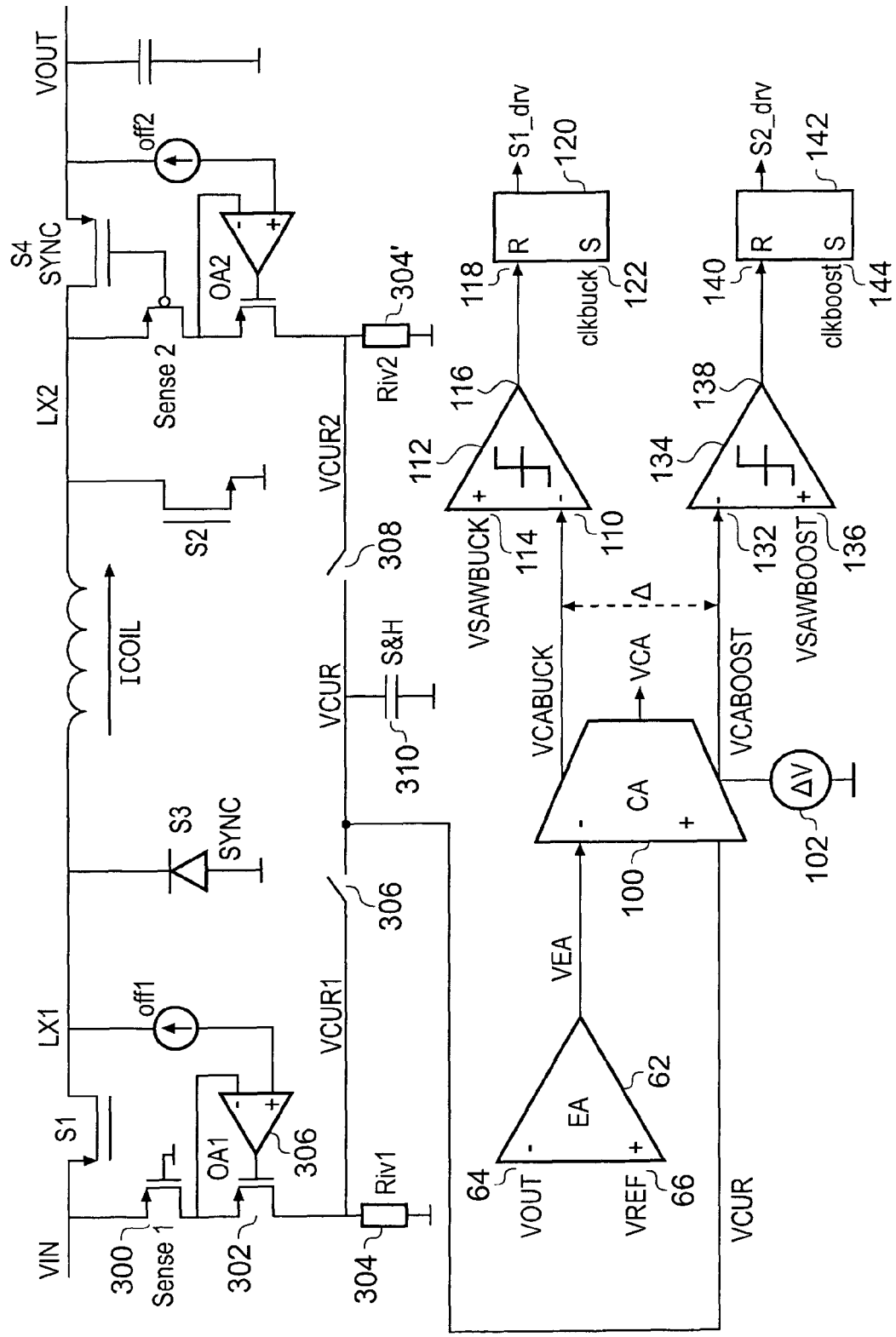
FIG. 12 illustrates a circuit for measuring the current in the inductor of the DC to DC converter.

As noted before with respect to FIGS. 5 and 7 it is necessary to measure the current flowing in the coil. It is also advantageous that this can be done inexpensively and without perturbing the operation of the converter. FIG. 12 shows an arrangement which is able to measure the current flowing into the coil and from the coil, and which also includes the control circuit shown in FIG. 7.

In order to measure the current flowing through the switch S1, a sensing FET 300 is connected with its drain connected to the drain of S1 and its source connected to the drain of a further transistor 302 whose source is connected to ground via a resistor 304 whose value is known such that the voltage occurring across the resistor 304 is accurately related to the current flowing in it. The transistor 302 is driven by an operational amplifier 306 whose inverting input is connected to the drain of the sensing transistor 300 and whose non-inverting input is connected to the drain of switch S1. Optionally, because offsets may occur, an offset generator may be interposed between the drain of switch S1 and the non-inverting input of the amplifier 306. However, for the time being, it is simple to assume that the offset generator is not required. Under these circumstances the voltage at the non-inverting input corresponds to the voltage at the drain of switch S1 and the action of the operational amplifier in conjunction with the field effect transistor 302 is to control the voltage occurring at the drain of the sensing transistor 300 to be identical to that occurring at the drain of switch S1. Therefore given that the voltages across the transistors are identical the current flowing through the transistor 300 will be proportionate to that flowing through switch S1, and be determined by the relative sizing of transistor 300 with respect to switch S1. Given that the currents will be matched by the scaling factor, then the current flowing through resistor 304 and consequently the voltage developed across it is an accurate representation of the current flowing through switch S1 provided that the feedback loop involving the operational amplifier 306 and the FET 302 is operating correctly. An equivalent circuit is formed in conjunction with switch S4 such that the current flowing from the coil can also be measured. The voltage developed across the resistor 304, and the corresponding resistor associated with switch S4 can be selectively sampled via switches 306 and 308 onto a sample and hold capacitor 310 if a sampled version of the signal is required or made directly available to the input of the amplifier 100. When operating in the digital domain, multiple samples and digitisations will be made during each charge and discharge cycle of the current in the inductor such that a digital approximation to the changing analog value can be obtained with sufficient accuracy to enable operation of the controller.

The clock signals clkbuck and clkboost are interleaved in such a way that one sensor is always active. To this purpose, clkboost is delayed with respect to clkbuck in order to enable each current measurement to be initiated and for setting to occur before the current values are captured.

Figure 13:
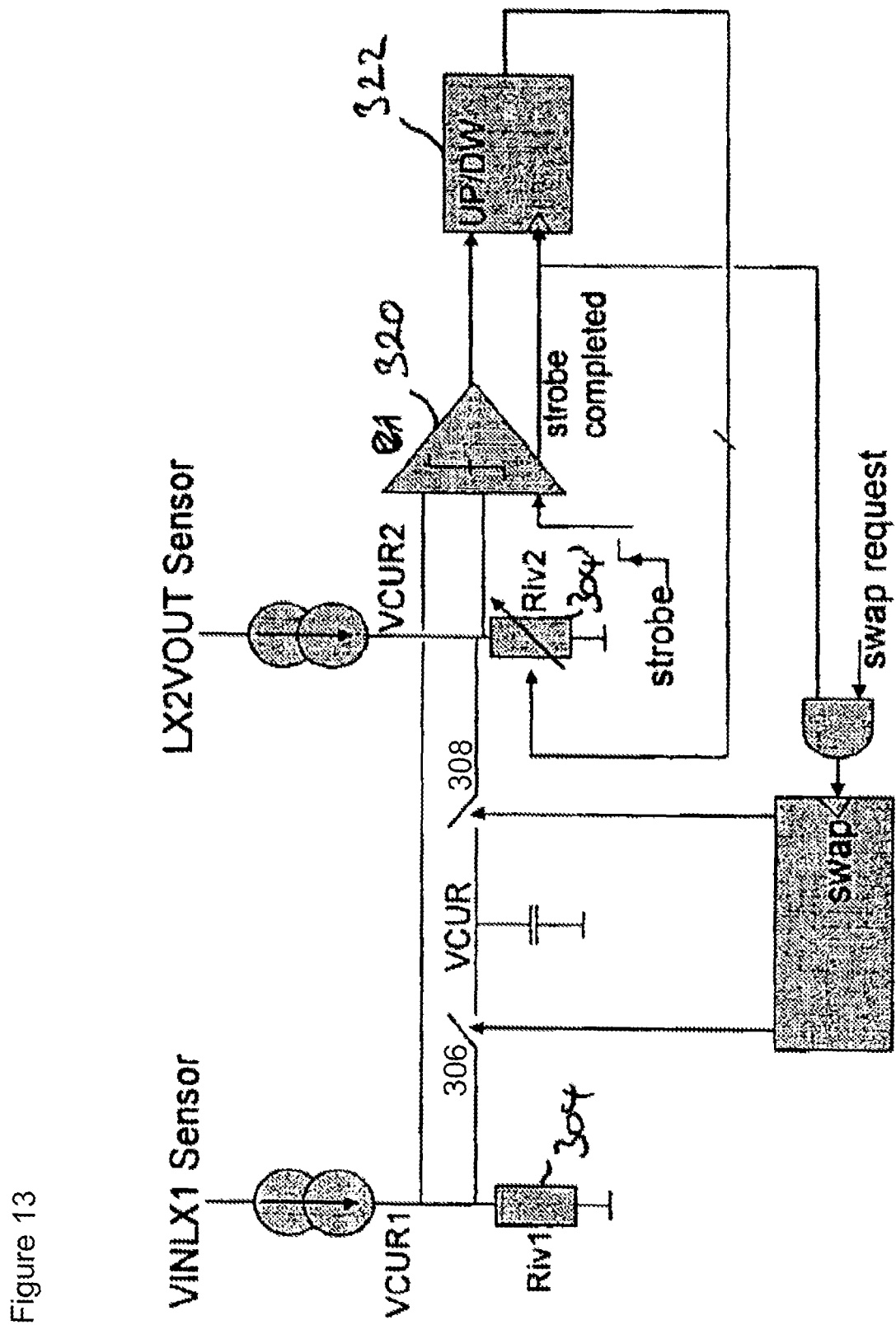
FIG. 13 shows a circuit for performing self calibration of the current measurements.

Because the voltages occurring could be quite small, the issue of sensor matching can become important. For example, if one error amplifier has an offset of +15 mV and the other has an offset of −15 mV then there is a total of 30 mV across the source-drains of the two FETs. If the resistances of the FET when on are only in the order of 30 milli-Ohms then there is an equivalent error of one amp between the measurements made by the two sensors. As a result the estimate of the current flowing to the coil would not be reliable because it would change every time the sensors swapped. In order to overcome this a circuit for achieving self calibration is schematically illustrated in FIG. 13. At every swapping instant the current through the coil can be assumed to be invariant. Therefore a preliminary comparison between the voltage occurring across the first resistor 304 and the second resistor 304' should result in the same voltage. At this instant a comparator 320 compares the voltages across the resistors, the comparator being triggered by a strobe signal which can be contemporaneous with the swap request. The comparator therefore compares the voltage across each of the resistors and either increments or decrements an up down counter 322 which in turn is used to control the value of the second resistor 304'. This can be achieved by forming the resistor 304' out of a chain of smaller resistors and selectively shorting them out via parallel transistors or removing the shorting such that the value of the second resistor 304' can vary in response to the counter value. Thus, after a few cycles the comparator corrects the values of the resistors such that the value of the second resistor oscillates around its optimal value and that the measurements of coil current are corrected so as to account for any offsets in the measurement circuit. Using this technique the effect of any offset associated with the operational amplifiers can be rapidly negated.

It is thus possible to produce a DC to DC converter which smoothly transitions from BUCK mode to BOOST mode via an intermediate BUCK BOOST mode without giving rise to glitches arising from swapping of the sequence of the transistor switches. Furthermore the comparator can also control the width of its BUCK BOOST window so as to enable it to be able to achieve voltage regulation whilst not impairing its efficiency, whilst the use of the average current mode controls allows the switching frequency to be increased, thereby giving rise to a decreased value of the inductor. Furthermore the use of current averaging makes the DC to DC converter less susceptible to perturbations from parasitic components and hence it reliability is improved. Finally, control of the duration of the switch signals and also automatic calibration of the current measurements both allow the effect of parasitic components or offsets to be removed, thereby giving rise to a DC to DC converter which is both robust, reliable, and inexpensive.

The invention claimed is:
1. A DC to DC converter comprising:
an inductor, first and second electrically controllable switches and a controller, wherein the first electrically controllable switch is interposed between an input node and a first terminal of the inductor and the second electrically controllable switch extends between a second terminal of the inductor and a common node or a ground, and where a first rectifier extends between the common node or ground and the terminal of the inductor and a second rectifier connects the second terminal of the inductor to an output node, wherein the controller controls the operation of the first and second switches to perform voltage step down or step up, as appropriate, to achieve a desired output voltage and wherein a decision about when to switch the first electrically controlled switch is made as a first function of a voltage error between the output voltage and a target output voltage, and an estimate of the current in the inductor (VCUR) based on both an estimate of a current flowing into the inductor and an estimate of a current from the inductor;
a first sensing transistor connected to the first electrically controllable switch;
a second sensing transistor connected in series with the first sensing transistor to form a common node;
a first operational amplifier having an output connected to drive the second sensing transistor, having an inverting input connected to the common node, and having a non-inverting input connected to the first electrically controllable switch;
a third sensing transistor connected to the second electrically controllable switch and the inductor;

a fourth sensing transistor connected in series with the third sensing transistor to form a second common node;

a second operational amplifier having an output connected to drive the fourth sensing transistor, having an inverting input connected to the second common node, and having a non-inverting input connected to a reference node of the output voltage, and wherein a voltage (VCUR1) at the source of the second sensing transistor forms the estimate of the current flowing into the inductor, and wherein a voltage (VCUR2) at the source of the fourth sensing transistor forms the estimate of the current flowing from the inductor.

2. The DC to DC converter as claimed in claim 1, wherein the non-inverting input of the first operational amplifier is connected to the first electrically controllable switch via an offset generator and the non-inverting input of the second operational amplifier is connected to the reference node via a second offset generator.

3. The DC to DC converter as claimed in claim 1, further comprising:
a first resistor connected in series between a common potential and the second sensing transistor; and
a second resistor connected in series between the common potential and the fourth sensing transistor.

4. The DC to DC converter as claimed in claim 3, further comprising:
a capacitor connected via a first sample switch to the first resistor and connected via a second sample switch to the second resistor.

5. The DC to DC converter as claimed in claim 4, wherein VCUR is a voltage developed across the capacitor by a selective sampling of VCUR1 and VCUR2 using the first and second sample switches.

6. The DC to DC converter as claimed in claim 1, wherein each sensing transistor and each electrically controllable switch includes a gate, a source, and a drain, and wherein the drain of the first sensing transistor is connected to the drain of the first electrically controllable switch, the source of the first sensing transistor is connected to the drain of the second sensing transistor, the source of the second sensing transistor is connected to a common potential via a resistor, the output of the first operational amplifier is connected to the gate of the second sensing transistor, and the non-inverting input of the first sensing transistor is connected to the source of the first electrically controllable switch.

7. The DC to DC converter as claimed in claim 1, further comprising:
a first resistor connected in series with a common potential and the second sensing transistor, such that VCUR1 is developed across the first resistor;
a variable resistor connected in series with the common potential and the fourth sensing transistor, such that VCUR2 is developed across the variable resistor, wherein the variable resistor includes an adjustment input for adjusting a resistance;
a comparator with a first input connected at VCUR1 and a second input connected at VCUR2, and an output connected to the adjustment input such that the resistance is adjusted based on a difference between VCUR1 and VCUR2.

8. The DC to DC converter as claimed in claim 7, wherein the comparator output is connected to an input of a two directional counter having an output connected to the adjustment input.

9. The DC to DC converter as claimed in claim 7, wherein the comparator includes a strobe input.

10. A self-calibrating inductor current estimating circuit, comprising:
a first resistor connected in series to a common potential and a first sensing transistor, such that a voltage (VCUR1) developed across the first resistor forms an estimation of a current flowing into an inductor;
a variable resistor connected in series to the common potential and a second sensing transistor, such that a voltage (VCUR2) developed across the variable resistor forms an estimation of a current flowing out of the inductor, wherein the variable resistor has a control input for adjusting a resistance of the variable resistor; and
a comparator having a first input connected to the first resistor at VCUR1 and a second input connected to the variable resistor at VCUR2, and an output connected to the control input of the variable resistor.

11. The self-calibrating circuit as claimed in claim 10, wherein the output of the comparator is connected to the input of the variable resistor via a bidirectional counter.

12. The self-calibrating circuit as claimed in claim 11, wherein the counter includes a strobe input connected to the comparator, such that the counter increments responsive to a strobe signal.

13. The self-calibrating circuit as claimed in claim 10, wherein the comparator includes a strobe input.

* * * * *